Nov. 17, 1925.
A. B. KENDALL
1,561,469
EXHAUST CONTROL MECHANISM FOR AIR BRAKE SYSTEMS
Filed April 28, 1924
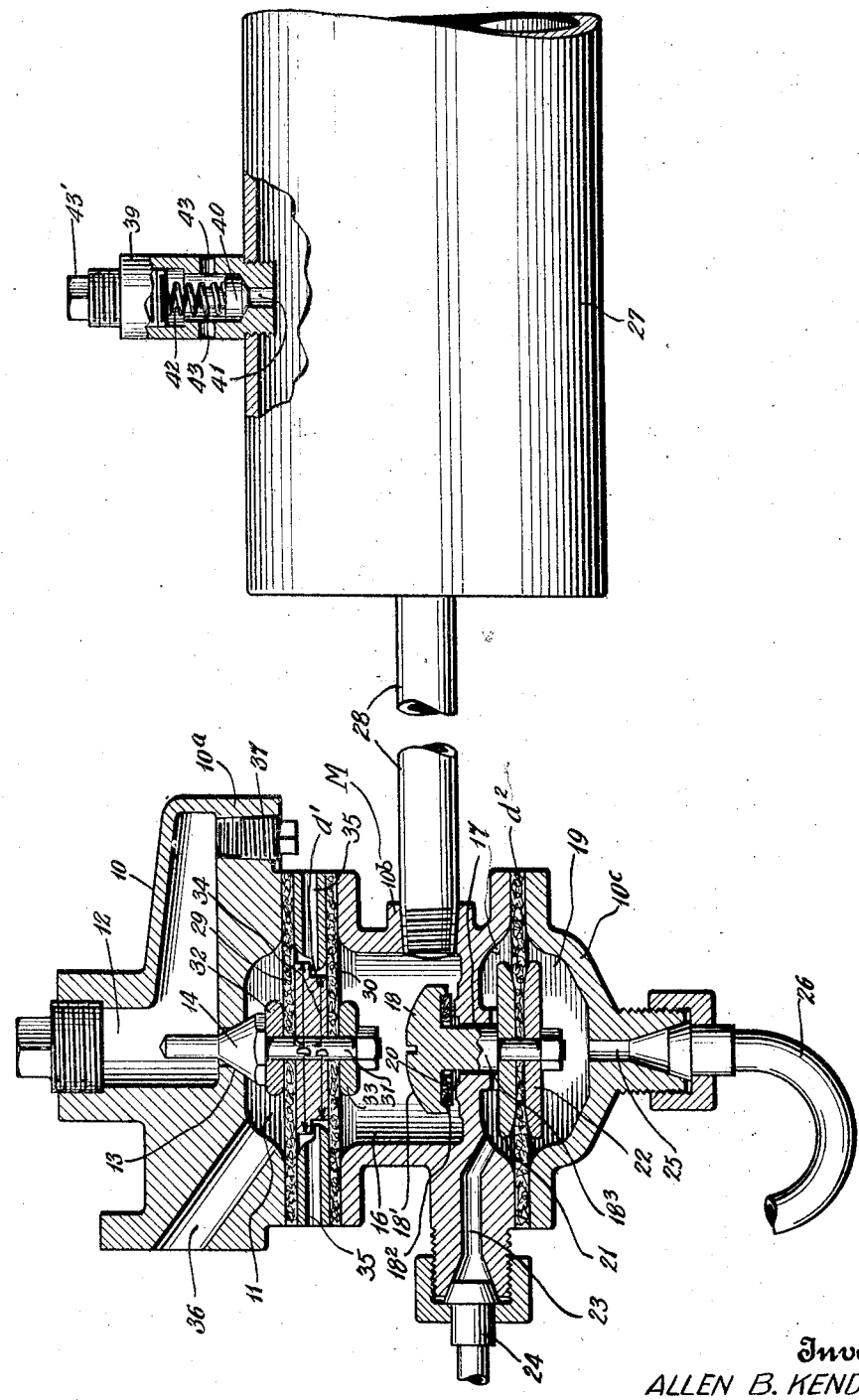
Inventor
ALLEN B. KENDALL
By his Attorneys
Cavanagh & James Patented Nov. 17, 1925.

1,561,469

UNITED STATES PATENT OFFICE.

ALLEN B. KENDALL, OF NIAGARA FALLS, NEW YORK, ASSIGNOR TO THE REGAN SAFETY DEVICES COMPANY, INC., OF NEW YORK, N. Y., A CORPORATION OF NEW YORK.

EXHAUST-CONTROL MECHANISM FOR AIR-BRAKE SYSTEMS.

Application filed April 28, 1924. Serial No. 709,443.

*To all whom it may concern:*

Be it known that I, ALLEN B. KENDALL, a citizen of the United States, and resident of Niagara Falls, in the county of Niagara and State of New York, have invented certain new and useful Improvements in Exhaust-Control Mechanism for Air-Brake Systems, of which the following is a specification.

This invention relates to train control apparatus, and more particularly to apparatus for automatically controlling the operation of the air brake system of a train; and has special reference to the provision of such an apparatus in which the amount of reduction of pressure in the brake pipe of the system is controlled when an automatic application is effected.

A principal desideratum of my present invention comprehends the provision of an apparatus for controlling the exhaust of air from the brake pipe of the air brake system when an automatic application of the brakes is made, so that only that reduction necessary to apply the brakes on the train is obtained, and so that any continued reduction is automatically prevented. The present invention has particular applicability to the train control system disclosed in the copending application of A. G. Shaver, Ser. No. 292,548, of May 25, 1919, in which the movement of a train is automatically controlled from the roadside, the present invention being intended for use with the combined reservoir and brake valve, disclosed in the patent to A. B. Kendall No. 1,474,836 of Nov. 30, 1923, used in such systems, comprising improvements of the exhaust control mechanism described and claimed in the copending application of A. G. Shaver Ser. No. 599,512, of Nov. 7, 1922.

In the operation of the system for controlling the movement of the train under unsafe conditions, a normally closed brake pipe valve is automatically opened, opening the brake pipe to exhaust to effect a reduction in pressure of the air therein to produce the application of the brakes. In the preferred operation of this system, the thus opened brake pipe valve is maintained open. To control or regulate the reduction of pressure in the brake pipe when this brake pipe valve is automatically opened and maintained open, there is employed the exhaust control mechanism disclosed in the above-mentioned copending application of A. G. Shaver, this mechanism operating to produce a fixed reduction of brake pipe pressure and to close the exhaust after such reduction is obtained.

The improvements in the present invention center about the provision of an exhaust control mechanism in which the ratio between the reduced brake pipe pressure and the initial brake pipe pressure is always maintained constant, irrespective of the amount or value of such initial brake pipe pressure; such mechanism having been found to produce a smooth application of the brakes and a gradual and non-jarring retardation of the train. The provision of such mechanism is also characterized by the elimination of all springs, producing an apparatus which is dependable and reliable in service.

To the accomplishment of the foregoing and such other objects as will hereinafter appear, this invention consists in the elements and their relation one to the other, as hereinafter particularly described and sought to be defined in the claims, reference being had to the accompanying drawings, which show a preferred embodiment of the invention, and in which:

The figure is a view partly taken in cross-section of my improved exhaust control mechanism.

Referring now more in detail to the drawings, the exhaust control mechanism of this invention, generally designated as M, comprises preferably a unit which is attached to the combined reservoir and brake valve disclosed in the aforementioned patent to A. B. Kendall No. 1,474,836, the connections being such as to control the exhaust by combined reservoir and brake pipe pressure, with the brake pipe pressure made the basis upon which a reduction in pressure is effected. In its preferred and more specific aspects, this unit consists of a casing 10 made up generally of three casting sections 10$^a$, 10$^b$ and 10$^c$.

The section 10$^a$ is provided with the chambers 11 and 12 intercommunicating by means of an exhaust port 13 which latter is controlled by a valve 14; the section 10$^b$ is provided with the chambers 15 and 16 intercommunicating by means of the ports 17, the latter being controlled by means of a second valve 18; and the third section 10ᶜ is provided with a pressure chamber 19.

For controlling the operation of the exhaust valve 14, there is provided a plurality of pneumatic devices preferably in the form of diaphragms, one of said pneumatic devices generally designated as $d'$ being fitted between the sections 10ᵃ and 10ᵇ for controlling the valve 14, and arranged so that one side of the pneumatic device is subject to fluid pressure in the chamber 11, and the other side of the same is subjected to fluid pressure in the chamber 16; and the other of said pneumatic devices generally designated as $d^2$ is fitted between the sections 10ᵇ and 10ᶜ for controlling the second valve 18, and is arranged so that one side thereof is subject to the fluid pressure in the chamber 15 and the other side thereof is subject to fluid pressure in the chamber 19.

For controlling the operation of the valve 18, the same is preferably attached to the diaphragm $d^2$, and to this end the valve preferably comprises a bolt member, the head 18' of which is provided with the gasket 18² cooperating with the seat 20 and the shank 18³ of which is secured to the diaphragm $d^2$ between the washers 21 and 22; and the diaphragm $d^2$ is operated by controlling the admission of fluid at brake pipe pressure into the chamber 15 and fluid at reservoir pressure into the chamber 19. For admitting fluid at brake pipe pressure into the chamber 15, the section 10ᵇ is provided with the duct 23, which communicates with a pipe 24, the latter being adapted to be connected directly to the brake pipe so that fluid at brake pipe pressure is always present in the chamber 15. For admitting fluid at reservoir pressure into the chamber 19, the section 10ᶜ is provided with the duct 25 which communicates with a pipe 26, which latter is adapted for connection to an electromagnetically controlled primary valve mechanism shown in the aforementioned Kandall patent, so that normally fluid at reservoir pressure moves into the chamber 19, and this pressure is operative against the under side of the diaphragm $d^2$ and in opposition to the brake pipe fluid pressure on the upper side thereof for elevating the diaphragm $d^2$ to maintain the valve 18 unseated so that under normal conditions the fluid at brake pipe pressure enters and fills the chamber 16.

For increasing the capacity of the chamber 16, there is preferably provided a capacity tank 27 connected to the section 10ᵇ by means of a pipe 28 which is always in open communication with the chamber 16. When an automatic application of the brakes is effected, the electromagnetically controlled primary valve heretofore mentioned is so operated as to open the chamber 19 to atmosphere, the fluid therein then flowing out through the pipe 26 and the diaphragm $d^2$ being then subject only to the fluid at brake pipe pressure in the chamber 15 moves to descended position for closing the valve 18, and fluid at brake pipe pressure is trapped in the chamber 16 and the capacity tank 27.

These operations of the diaphragm $d^2$ and the valve 18 control the operations of the diaphragm device $d'$ and the exhaust control valve 14. As heretofore mentioned, it is a principal desideratum of the present invention to control the exhaust by means of the combined pressures in the brake pipe and main reservoir, and to control such exhaust so that the ratio of the reduced brake pipe pressure to the initial brake pipe pressure is always a constant, irrespective of the value of such initial brake pipe pressure, this so that the reduction in the brake pipe pressure is always a constant percentage of the initial brake pipe pressure. To this end, the pneumatic device $d'$ comprises a pair of spaced diaphragms 29 and 30 connected to the valve 14 by means of the bolt member 31 and interposed between the washers 32 and 33, a spacing member 34 being provided between the diaphragms 29 and 30 and constructed so that the top and bottom diameters $D^2$ and $D^1$ thereof are different, as indicated by the arrows in the figure, the areas represented by these diameters always bearing a fixed relation to each other depending upon the prescribed reduction desired. The space between the diaphragms is always open to atmosphere through the ducts 35.

Normally the valve 14 is closed, the diaphragm device $d'$ being then subject to fluid at brake pipe pressure active against the lower diaphragm 30 and fluid at the reduced brake pipe pressure of the previous application effective on the upper diaphragm 29. When an automatic application of the brakes takes place, the reservoir and brake valve heretofore mentioned is operated to open the brake pipe to the chamber 11, the air then flowing from the brake pipe into the casing section 10 and chamber 11 thereof through the duct 36. Simultaneously, as heretofore stated, the valve 18 closes so that the opposite sides of the diaphragm device $d'$ are subject to the same brake pipe pressure; and due to the greater working area $D^2$, the diaphragm device $d'$ is forced downwardly, unseating the valve 14 from the port 13. The brake pipe fluid is thereafter exhausted to atmosphere from the chamber 12 through the port 37, and this continues until the brake pipe pressure is reduced to a point where the total pressure on the diaphragm 29 is below the total pressure upward on the diaphragm 30, at which time the diaphragm device is forced upwardly to close the valve 14 and the exhaust port 13.

In recharging the brake pipe, it is desired that the chamber 16 and the capacity tank 27 should always be filled with fluid at the normal brake pipe pressure. In recharging the brake pipe, the pressure may at times build up to an abnormal point at the head end, so that the pressure in the chamber 16 and capacity tank 27 may build up to a point beyond normal brake pipe pressure. If an automatic application takes place immediately after this excess pressure is reached and before sufficient time elapses to produce stabilization of the pressure in all parts of the brake pipe system, it will be apparent that the reduction of pressure when such automatic application takes place will be below that desired. In order to prevent this possibility, in the preferred construction of my exhaust control mechanism there is provided a pressure relief means for the chamber 16 or the capacity tank 27 arranged to function so as to relieve the capacity tank or the trap chamber from pressure in excess of the normal brake pipe pressure. This relief means preferably comprises a poppet or relief valve 39 fitted to the capacity tank 27, the relief valve being provided with a valve member 40 normally seated to close the port 41 and urged into seating position by means of a spring 42 acted upon by the adjustable plug 43', the arrangement and design being such that the valve 40 will open when the pressure in the capacity tank 27 exceeds the normal brake pipe pressure, as for example, 70 pounds. When, therefore, there is a sudden building up of pressure in the capacity tank 27, the excess pressure will open the valve 40 and will escape to atmosphere through the atmospheric ports 43, 43.

The use and operation of my improved exhaust control mechanism will in the main be fully apparent from the above detailed description thereof. It will be further apparent that with the provision of the improvements, the exhaust or reduction of the brake pipe pressure may be controlled efficiently by the combined reservoir and brake pipe pressures; and this reduction is effected so as to obtain a constant percentage or proportionate change of the initial brake pipe pressure irrespective of its value. It will be further evident that in accomplishing these functions, I am enabled to eliminate all springs and to produce a structure which may be always relied upon for efficient service even after long periods of use.

While this invention has been shown in the preferred form, it will be obvious that many changes and modifications may be made in the structure disclosed without departing from the spirit of the invention, defined in the following claims.

I claim:

1. A train brake control apparatus comprising a valve controlling an exhaust port, a pneumatic device having different effective pressure areas on opposite sides thereof for operating the said valve, means for admitting fluid at brake pipe pressure to one side of said device, a second valve for controlling the admission of fluid at brake pipe pressure to the opposite side of said device, a second pneumatic device for operating the second valve, and means for admitting fluid at brake pipe and reservoir pressures respectively onto opposite sides of said second pneumatic device.

2. A train brake control apparatus comprising a valve controlling an exhaust port, a diaphragm device having different effective pressure areas on opposite sides thereof for operating the said valve, a port for admitting fluid at brake pipe pressure to one side of said device, a second valve for controlling the admission of fluid at brake pipe pressure to the opposite side of said device, a second diaphragm device for operating the second valve, and means for admitting fluid at brake pipe and reservoir pressures respectively onto opposite sides of said second diaphragm device.

3. A train brake control apparatus comprising a normally closed valve controlling an exhaust port, a pneumatic device having different effective pressure areas on opposite sides thereof for operating the said valve, means for admitting fluid at brake pipe pressure to one side of said device, a second and normally open valve for controlling the admission of fluid at brake pipe pressure to the opposite side of said device, a second pneumatic device for operating the second valve, and means for admitting fluid at brake pipe and reservoir pressures respectively onto opposite sides of said second pneumatic device.

4. A train brake control apparatus comprising a casing, a valve therein controlling an exhaust port, a pneumatic device therein having different effective pressure areas on opposite sides thereof for operating the said valve, a port in said casing for admitting fluid at brake pipe pressure to one side of said device, a second valve in said casing for controlling the admission of fluid at brake pipe pressure to the opposite side of said device, a second pneumatic device for operating the second valve, and ports in the casing for admitting fluid at brake pipe and reservoir pressures respectively onto opposite sides of said second pneumatic device.

5. A train brake control apparatus comprising a casing, a valve therein controlling an exhaust port, a chamber in said casing, a pneumatic device having different effective pressure areas on opposite sides thereof for operating said valve located at one side of said chamber, means for admitting fluid at brake pipe pressure to one side of said pneumatic device, a second valve located on the opposite side of said chamber for controlling the admission of fluid at brake pipe pressure into said chamber and to the opposite side of said device, a second pneumatic device for operating the second valve, and means for admitting fluid at brake pipe and reservoir pressures respectively onto opposite sides of said second pneumatic device.

6. A train brake control apparatus comprising a casing, a normally closed valve therein controlling an exhaust port, a chamber in said casing, a diaphragm device having different effective pressure areas on opposite sides thereof for operating said valve located at one side of said chamber, means for admitting fluid at brake pipe pressure to one side of said diaphragm device, a second and normally open valve located on the opposite side of said chamber for controlling the admission of fluid at brake pipe pressure into said chamber and to the opposite side of said device, a second diaphragm device for operating the second valve, and means for admitting fluid at brake pipe and reservoir pressures respectively onto opposite sides of said second diaphragm device.

7. A train brake control apparatus comprising a casing, a pair of communicating chambers therein separated by an exhaust port, a valve controlling the exhaust port, a second pair of communicating chambers in said casing, a pneumatic device having different effective pressure areas on opposite sides thereof for operating said valve located between adjacent chambers of the different pairs, means for admitting fluid at brake pipe pressure to one side of said pneumatic device, a second valve controlling the communication between the second pair of chambers for controlling the admission of fluid at brake pipe pressure to the opposite side of said device, a second pneumatic device for operating the second valve, and means for admitting fluid at brake pipe and reservoir pressures respectively onto opposite sides of said second pneumatic device.

8. A train brake control apparatus comprising a casing, a valve therein controlling an exhaust port, a chamber in said casing, a capacity tank in communication with said chamber, a pneumatic device for operating said valve located at one side of said chamber, means for admitting fluid at brake pipe pressure to one side of said pneumatic device, a second valve located on the opposite side of said chamber for controlling the admission of fluid at brake pipe pressure into said chamber and to the opposite side of said device, a second pneumatic device for operating the second valve, and means for admitting fluid at brake pipe and reservoir pressures respectively onto opposite sides of said second pneumatic device.

9. An apparatus for controlling the reduction of brake pipe pressure in a train air brake system comprising a valve mechanism controlling an exhaust port, a pneumatic device having different effective pressure areas on opposite sides thereof for operating the valve mechanism, means for admitting fluid at brake pipe pressure on the valve side of said device, and means for admitting and trapping fluid at brake pipe pressure on the opposite side of said device.

10. An apparatus for controlling the reduction of brake pipe pressure in a train air brake system comprising a valve mechanism controlling an exhaust port, a diaphragm device connected to said valve mechanism and having different effective pressure areas on opposite sides thereof, the larger effective area being on the valve side of said device, means for admitting a fluid at brake pipe pressure to the valve side of said device, and means for admitting and trapping fluid at the same pressure on the opposite side of said device.

11. An apparatus for controlling the reduction of brake pipe pressure in a train air brake system comprising a casing, a valve therein for controlling an exhaust port, a pneumatic device having different effective areas on opposite sides thereof for operating the said valve, a port in said casing for admitting fluid at brake pipe pressure to the valve side of said device, and means for admitting and trapping fluid at the same pressure on the opposite side of said device.

12. An apparatus for controlling the reduction of brake pipe pressure in a train air brake system comprising a casing, a valve therein controlling an exhaust port, a chamber in said casing, a pneumatic device between said chamber and valve for operating the said valve to produce a reduction in brake pipe pressure which is always a predetermined percentage of the initial brake pipe pressure, means for admitting fluid at brake pipe pressure onto the valve side of said device, and means for admitting and trapping fluid at the same pressure in said chamber to be effective on the opposite side of said device.

13. An apparatus for controlling the reduction of brake pipe pressure in a train air brake system comprising a casing, a valve therein controlling an exhaust port, a chamber in said casing, a capacity tank in communication with said chamber, a pneumatic device between said chamber and valve for operating the said valve to produce a reduction in brake pipe pressure which is always a predetermined percentage of the initial brake pipe pressure, means for admitting fluid at brake pipe pressure onto the valve side of said device, and means for admitting and trapping fluid at the same pressure in said chamber to be effective on the opposite side of said device.

14. An apparatus for controlling the reduction of brake pipe pressure in a train air brake system comprising a casing, a valve therein controlling an exhaust port, a chamber in said casing, a pneumatic device between said chamber and valve having different effective pressure areas on opposite sides thereof for operating the said valve to produce a reduction in brake pipe pressure which is always a predetermined percentage of the initial brake pipe pressure, means for admitting fluid at brake pipe pressure onto the valve side of said device, and means for admitting and trapping fluid at the same pressure in said chamber to be effective on the opposite side of said device.

15. A train brake control apparatus comprising a casing, a pair of communicating chambers therein separated by an exhaust port, a valve controlling the exhaust port, spaced diaphragms connected to said valve for operating the same, the said diaphragm having different effective pressure areas, a chamber between said diaphragms open to atmosphere, means for admitting fluid at brake pipe pressure onto one of said diaphragms, and means for admitting and trapping fluid at the same pressure effective on the other of said diaphragms.

16. An apparatus for controlling the reduction of brake pipe pressure in a train air brake system comprising a casing, a valve therein controlling an exhaust port, a chamber in said casing, a pneumatic device between said chamber and valve for operating the said valve to produce a reduction in brake pipe pressure, means for admitting fluid at brake pipe pressure onto the valve side of said device, means for admitting and trapping fluid at brake pipe pressure in said chamber to be effective on the opposite side of said device, and means for relieving the said chamber of pressure in excess of the normal brake pipe pressure.

17. An apparatus for controlling the reduction of brake pipe pressure in a train air brake system comprising a casing, a valve therein controlling an exhaust port, a chamber in said casing, a capacity tank in communication with said chamber, a pneumatic device between said chamber and valve for operating the said valve to produce a reduction in brake pipe pressure, means for admitting fluid at brake pipe pressure onto the valve side of said device, means for admitting and trapping fluid at brake pipe pressure in said chamber to be effective on the opposite side of said device, and means for relieving the said capacity tank of pressure in excess of the normal brake pipe pressure.

18. An apparatus for controlling the reduction of brake pipe pressure in a train air brake system comprising a casing, a valve therein controlling an exhaust port, a chamber in said casing, a capacity tank in communication with said chamber, a pneumatic device between said chamber and valve for operating the said valve to produce a reduction in brake pipe pressure, means for admitting fluid at brake pipe pressure onto the valve side of said device, means for admitting and trapping fluid at brake pipe pressure in said chamber to be effective on the opposite side of said device, and a relief valve connected to said capacity tank and operative to relieve the said capacity tank of pressure in excess of normal brake pipe pressure.

Signed at Niagara Falls in the county of Niagara and State of New York this 7th day of April A. D. 1924.

ALLEN B. KENDALL.